US012596367B2

(12) United States Patent  
Nordbruch

(10) Patent No.: US 12,596,367 B2  
(45) Date of Patent: Apr. 7, 2026

---

(54) METHOD FOR THE SEMI-AUTOMATED GUIDANCE OF A MOTOR VEHICLE

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 190 days.

(21) Appl. No.: 18/005,198

(22) PCT Filed: Jul. 15, 2021

(86) PCT No.: PCT/EP2021/069727

§ 371 (c)(1),  
(2) Date: Jan. 12, 2023

(87) PCT Pub. No.: WO2022/053207

PCT Pub. Date: Mar. 17, 2022

(65) Prior Publication Data

US 2023/0266755 A1    Aug. 24, 2023

(30) Foreign Application Priority Data

Sep. 14, 2020    (DE) ..................... 10 2020 211 484.6

(51) Int. Cl.  
*G05D 1/00*        (2024.01)  
*G05D 1/02*        (2020.01)

(52) U.S. Cl.  
CPC ......... *G05D 1/0055* (2013.01); *G05D 1/0088* (2013.01); *G05D 1/0276* (2013.01)

(58) Field of Classification Search  
None  
See application file for complete search history.

(56) References Cited

U.S. PATENT DOCUMENTS

| | | | |
|---|---|---|---|
| 2002/0198632 A1* | 12/2002 | Breed ..................... | G01S 17/86 |
| | | | 701/472 |
| 2016/0376136 A1* | 12/2016 | Miller ..................... | B62D 6/00 |
| | | | 701/49 |

(Continued)

FOREIGN PATENT DOCUMENTS

| | | |
|---|---|---|
| DE | 102013001326 A1 | 7/2014 |
| DE | 102019214415 A1 | 3/2021 |

(Continued)

OTHER PUBLICATIONS

Machine translation of JP 2018190134 A (Year: 2018).*  
International Search Report for PCT/EP2021/069727, Issued Dec. 6, 2021.

*Primary Examiner* — Anne Marie Antonucci  
*Assistant Examiner* — Kyle S Park  
(74) *Attorney, Agent, or Firm* — NORTON ROSE FULBRIGHT US LLP

(57) ABSTRACT

A method for the safe, at least semi-automated guidance of a motor vehicle, supported by an infrastructure. During the infrastructure-supported, at least semi-automated guidance of the motor vehicle, control signals are generated for the at least semi-automated control of a lateral guidance and/or longitudinal guidance of the motor vehicle without infrastructure support, and a functionality of a support by the infrastructure for an at least semi-automated guidance of the motor vehicle is checked, the infrastructure-supported, at least semi-automated guidance of the motor vehicle being terminated depending on a result of the check and the control signals being output in order to guide the motor vehicle in at least semi-automated fashion based on the generated output control signals, without support by the infrastructure. A device, a computer program, and a machine-readable storage medium are also described.

8 Claims, 3 Drawing Sheets

(56)     References Cited

U.S. PATENT DOCUMENTS

| | | | |
|---|---|---|---|
| 2017/0341575 A1* | 11/2017 | Hauler | G09F 13/16 |
| 2018/0095457 A1 | 4/2018 | Lee et al. | |
| 2019/0340921 A1* | 11/2019 | Ran | G08G 1/07 |
| 2020/0090511 A1 | 3/2020 | Tao et al. | |
| 2020/0148179 A1* | 5/2020 | Kohlhuber | G06V 20/582 |
| 2021/0197801 A1* | 7/2021 | Oh | G08G 1/096816 |
| 2022/0073062 A1* | 3/2022 | Gariepy | G05D 1/0297 |
| 2022/0076565 A1* | 3/2022 | Bartkowiak | G08G 1/0133 |

FOREIGN PATENT DOCUMENTS

| | | | |
|---|---|---|---|
| DE | 102019214420 A1 | 3/2021 | |
| DE | 102019214423 A1 | 3/2021 | |
| DE | 102019214443 A1 | 3/2021 | |
| DE | 102019214448 A1 | 3/2021 | |
| JP | 2010256980 A | 11/2010 | |
| JP | 2018190134 A | 11/2018 | |
| JP | 2020104547 A | 7/2020 | |

* cited by examiner

101 — start

103 — generate control signals

105 — check functionality

107 — terminate infrastructure supported at least semi-automated guidance

109 — output generated control signals device for carrying out method — 201 machine-readable storage medium computer program 303　　301

METHOD FOR THE SEMI-AUTOMATED GUIDANCE OF A MOTOR VEHICLE

FIELD

The present invention relates to a method for the safe, at least semi-automated guidance of a motor vehicle, supported by an infrastructure. The present invention also relates to a device, a computer program and a machine-readable storage medium.

BACKGROUND INFORMATION

German Patent Application No. DE 10 2013 001 326 A1 describes a motor vehicle which is designed to exchange operating data with a traffic object located in a vicinity of the vehicle, and thereby to coordinate a driving maneuver of the motor vehicle with the traffic object.

SUMMARY

An object of the present invention is to provide efficient, safe, at least semi-automated guidance of a motor vehicle, supported by an infrastructure.

This objective may be achieved with the aid of the present invention. Advantageous refinements of the present invention are disclosed herein.

According to a first aspect of the present invention, a method is provided for the safe, at least semi-automated guidance of a motor vehicle supported by an infrastructure. According to an example embodiment of the present invention, during the infrastructure-supported, at least semi-automated guidance of the motor vehicle, control signals are generated for the at least semi-automated control of a lateral guidance and/or longitudinal guidance of the motor vehicle without infrastructure support, and a functionality of a support by the infrastructure for an at least semi-automated guidance of the motor vehicle is checked, the infrastructure-supported, at least semi-automated guidance of the motor vehicle being terminated depending on a result of the check and the control signals being output in order to guide the motor vehicle in at least semi-automated fashion without support by the infrastructure, based on the generated output control signals.

According to a second aspect of the present invention, a device is provided which is equipped to carry out all steps of the method according to the first aspect.

According to a third aspect of the present invention, a computer program is provided which includes commands that, upon execution of the computer program by a computer, e.g., by the device according to the second aspect, prompt it to carry out a method according to the first aspect.

According to a fourth aspect of the present invention, a machine-readable storage medium is provided, on which the computer program according to the third aspect is stored.

The present invention is based on and includes the finding that the objective above may be achieved because, while the motor vehicle is being guided in at least semi-automated fashion supported by infrastructure, control signals are generated for the at least semi-automated control of a lateral guidance and/or longitudinal guidance of the motor vehicle, these control signals being generated, however, without a support by the infrastructure.

Thus, as a fallback mechanism, control signals are therefore available which, in the event of a loss or limited functionality of the support by the infrastructure, may be used to guide the motor vehicle in at least semi-automated fashion based on these control signals.

Consequently, it is possible in advantageous manner to compensate efficiently for a loss or a limitation of the functionality of the support by the infrastructure.

In addition, for example, critical situations for the motor vehicle and/or for objects in the driving environment or in the area surrounding the motor vehicle may thereby be avoided.

Thus, the present invention disclosed herein is based specifically on the fact that, in addition to and in parallel to the use of the support by the infrastructure, the driving task is carried out in the motor vehicle without this support by the infrastructure, however without this execution of this driving task actually being implemented, so long as the support by the infrastructure is at least partially ensured. The execution of the driving task in the motor vehicle without the support by the infrastructure thus initially takes place in such a way that although control signals—necessary for carrying out the driving task—for the at least semi-automated control of the lateral guidance and/or longitudinal guidance of the motor vehicle are generated, for the time being they are not yet output, however.

The motor vehicle may thus first of all be guided in at least semi-automated fashion with the support of infrastructure. Secondly, it may also be guided in vehicle-centered, at least semi-automated fashion. Vehicle-centered here means specifically that the motor vehicle is guided in at least semi-automated fashion based on the data generated or produced in-vehicle.

For example, the control signals are generated on the basis of the driving-environment-sensor data of the driving-environment sensors of the motor vehicle and not on the basis of infrastructure driving-environment-sensor data of infrastructure driving-environment sensors which are distributed spatially within an area surrounding the motor vehicle.

An infrastructure-supported, at least semi-automated guidance of a motor vehicle means, namely, that the motor vehicle is guided in at least semi-automated fashion based on infrastructure data.

This infrastructure data is made available to the motor vehicle, particularly with the aid of the infrastructure.

For instance, infrastructure data includes handling instructions to the motor vehicle.

Infrastructure data includes, e.g., information about a driving environment or an area surrounding the motor vehicle.

For example, infrastructure data includes sensor data from one or more driving-environment sensors which are distributed spatially within the infrastructure.

In one specific embodiment of the present invention, one or more driving-environment sensors is/are disposed on one particularly intended infrastructure element of the infrastructure. By way of example, an infrastructure element is one of the following infrastructure elements: Streetlight, traffic sign, traffic-sign gantry, utility pole, bridge, building.

In one specific embodiment of the present invention, a driving-environment sensor is one of the following driving-environment sensors: Lidar sensor, radar sensor, ultrasonic sensor, magnetic-field sensor, infrared sensor and/or motion sensor. In particular, various driving-environment sensors may be used. Notably, this has the technical advantage of redundancy and diversity.

For instance, infrastructure data includes a setpoint trajectory which the motor vehicle should follow while being guided in at least semi-automated fashion.

For example, infrastructure data includes weather data in the driving environment or in the area surrounding the motor vehicle.

Infrastructure-supported thus means, namely, that the infrastructure provides data, in the present case the infrastructure data, to the motor vehicle, based on which the motor vehicle is guided and/or is able to be guided in at least semi-automated fashion.

For instance, infrastructure data includes control commands for the at least semi-automated control of a lateral guidance and/or longitudinal guidance of the motor vehicle.

This means thus that the motor vehicle is and/or is able to be controlled remotely with the aid of the infrastructure, utilizing such control commands.

In particular, this means thus that the infrastructure controls and/or is able to control the motor vehicle remotely, utilizing such control commands.

So, in other words, the motor vehicle is able to be driven and/or is driven by the infrastructure, based on such control commands.

A safe, at least infrastructure-supported, at least semi-automated guidance of a motor vehicle means specifically that a probability for an accident or a collision of the motor vehicle is less than, or equal to or less than, a predetermined probability threshold value. Thus, safe means, namely, that in case of a fault or if a problem arises during the infrastructure-supported, at least semi-automated guidance of the motor vehicle, an accident or a collision of the motor vehicle is or is reduced to less than, or equal to or less than, a predetermined probability threshold value.

The wording "at least semi-automated guidance" includes one or more of the following cases: Assisted guidance, semi-automated guidance, highly automated guidance, fully automated guidance.

Assisted guidance means that a driver of the motor vehicle permanently carries out either the lateral guidance or the longitudinal guidance of the motor vehicle. The other driving task in each case (thus, a control of the longitudinal guidance or the lateral guidance of the motor vehicle) is carried out automatically. In other words, in the case of assisted guidance of the motor vehicle, either the lateral guidance or the longitudinal guidance is thus controlled automatically.

Semi-automated guidance means that in a specific situation (for example: Driving on a turnpike, driving within a parking facility, passing an object, driving within a traffic lane which is defined by traffic-lane markings) and/or for a certain period of time, a longitudinal guidance and a lateral guidance of the motor vehicle are controlled automatically. A driver of the motor vehicle does not himself have to control the longitudinal and lateral guidance of the motor vehicle manually. However, the driver must constantly monitor the automatic control of the longitudinal and lateral guidance, in order to be able to intervene manually, if necessary. The driver must be ready at any time to completely take over the guidance of the motor vehicle.

Highly automated guidance means that for a certain period of time in a specific situation (for example: Driving on a turnpike, driving within a parking facility, passing an object, driving within a traffic lane which is defined by traffic-lane markings) a longitudinal guidance and a lateral guidance of the motor vehicle are controlled automatically. A driver of the motor vehicle does not himself have to control the longitudinal and lateral guidance of the motor vehicle manually. The driver does not have to monitor the automatic control of the longitudinal and lateral guidance constantly, in order to be able to intervene manually if necessary. If required, a takeover request is output automatically—particularly with a sufficient time reserve—to the driver to take over the control of the longitudinal and lateral guidance. The driver must therefore potentially be in the position to take over the control of the longitudinal and lateral guidance. Limits of the automatic control of the lateral and longitudinal guidance are detected automatically. In the case of highly automated guidance, it is not possible to automatically bring about a minimal-risk state in every initial situation.

Fully automated guidance means that in a specific situation (for example: Driving on a turnpike, driving within a parking facility, passing an object, driving within a traffic lane which is defined by traffic-lane markings) a longitudinal guidance and a lateral guidance of the motor vehicle are controlled automatically. A driver of the motor vehicle does not himself have to control the longitudinal and lateral guidance of the motor vehicle manually. The driver does not have to monitor the automatic control of the longitudinal and lateral guidance, in order to be able to intervene manually if necessary. Prior to a termination of the automatic control of the lateral and longitudinal guidance, a prompt is effected automatically to the driver, particularly with a sufficient time reserve, to take over the driving task (control of the lateral and longitudinal guidance of the motor vehicle). If the driver does not take over the driving task, there is a return automatically to a minimal-risk state. Limits of the automatic control of the lateral and longitudinal guidance are detected automatically. In all situations, it is possible to return automatically to a minimal-risk system state.

According to one specific embodiment of the present invention, checking the functionality of the support by the infrastructure includes a check of the correctness and/or plausibility of infrastructure data determined for the at least semi-automated guidance of the motor vehicle, so that the result indicates whether the infrastructure data is correct and/or plausible.

For example, this may yield the technical advantage that a loss or a limitation of the functionality may be detected efficiently.

For instance, if the result indicates that the infrastructure data is correct and/or plausible, then it is decided or determined that the motor vehicle will continue to be guided in at least semi-automated fashion, supported by infrastructure.

For example, if the result indicates that the infrastructure data is not correct and/or plausible, then the infrastructure-supported, at least semi-automated guidance of the motor vehicle is terminated, and the control signals are output.

According to one specific embodiment of the present invention, if the result of the check indicates that the functionality is limited or is lost, then the infrastructure-supported, at least semi-automated guidance of the motor vehicle is terminated and the control signals are output.

According to one specific embodiment of the present invention, the control signals are generated in such a way that based on the output control signals, the motor vehicle is guided in at least semi-automated fashion in a restricted driving mode in which only a limited range of functions in terms of an at least semi-automated guidance is made available, or is guided in at least semi-automated fashion in a non-restricted driving mode in which a full range of functions in terms of an at least semi-automated guidance is made available.

For example, this may result in the technical advantage that the motor vehicle is able to be guided safely in at least semi-automated fashion even without a support by the infrastructure.

According to one specific embodiment of the present invention, a maximum permissible motor-vehicle speed is less in the restricted driving mode than in the non-restricted driving mode.

For instance, this may yield the technical advantage that a risk of accident or a risk of collision of the motor vehicle is able to be reduced because of the lower maximum permissible motor-vehicle speed.

According to one specific embodiment of the present invention, a maximum permissible motor-vehicle accelera-tion is less in the restricted driving mode than in the non-restricted driving mode.

For instance, this may yield the technical advantage that a risk of accident or a risk of collision of the motor vehicle is able to be reduced because of the lower maximum permissible motor-vehicle acceleration.

According to one specific embodiment of the present invention, no lane change is allowed to be carried out in the restricted driving mode.

For instance, this may yield the technical advantage that a risk of accident or a risk of collision of the motor vehicle is able to be reduced because of the fact that no lane change is allowed to be carried out.

In one specific embodiment of the present invention, a distance to an object located in front of the motor vehicle in the direction of travel of the motor vehicle is greater in the restricted driving mode than in the non-restricted driving mode. For example, the object located in front of the motor vehicle in the direction of travel of the motor vehicle is an object driving ahead. The object is a further motor vehicle, for instance, particularly a further motor vehicle in front. The object is a cyclist, for example, particularly a cyclist riding ahead. For instance, an object is a pedestrian, par-ticularly a pedestrian in front.

The greater distance results in the technical advantage that a reaction time may be greater compared to a smaller distance, for example.

In one specific embodiment of the present invention, prior to a termination of the infrastructure-supported, at least semi-automated guidance of the motor vehicle and the output of the generated control signals, the step of checking the functionality of the support by the infrastructure is carried out multiple times, and only after repeated imple-mentation of the step of checking the functionality of the support by the infrastructure is it decided, depending on one or more pertinent results of the repeated check of the functionality of the support by the infrastructure, whether the infrastructure-supported, at least semi-automated guid-ance of the motor vehicle will be terminated and the gen-erated control signals output.

For example, this may bring about the technical advan-tage that a temporary loss or a temporary limitation of the functionality is able to be detected efficiently, such a tem-porary loss then not necessarily having to lead to a termi-nation of the infrastructure-supported, at least semi-auto-mated guidance of the motor vehicle.

According to one specific embodiment of the present invention, if the result of the check of the functionality of the support by the infrastructure indicates a loss of the func-tionality or a limitation of the functionality, it is checked whether the loss or the limitation has an effect on the at least semi-automated guidance of the motor vehicle, the infra-structure-supported, at least semi-automated guidance of the motor vehicle being terminated and the control signals being output depending on a result of the check as to whether the loss or the limitation has an effect on the at least semi-automated guidance of the motor vehicle.

For example, this may provide the technical advantage that the motor vehicle may be guided efficiently in at least semi-automated fashion.

In particular, if the result of the check as to whether the loss or the limitation will have an effect on the at least semi-automated guidance of the motor vehicle indicates that the loss or the limitation has no effect on the at least semi-automated guidance of the motor vehicle, the infra-structure-supported, at least semi-automated guidance of the motor vehicle is continued.

For example, this may yields the further technical advan-tage that there is thus always more information (infrastruc-ture data) than when the motor vehicle travels based only on in-vehicle data or information. For instance, in this way greater comfort and/or greater safety may be ensured.

According to one specific embodiment of the present inventions are documented, in particular, are documented in a blockchain.

For instance, this may yield the technical advantage that even after the method has been carried out or implemented, it is able to be analyzed later based on the documentation. In particular, the documenting in a blockchain has the technical advantage that the documentation is tamperproof and impos-sible to counterfeit.

A blockchain (also block chain, English for Blockkette) specifically is a continuously expandable list of data records, called "blocks", which are chained together with the aid of one or more cryptographic processes. In this context, each block includes, namely, a cryptographically secure hash (erratic value) of the previous block, particularly a time stamp and especially transaction data.

According to one specific embodiment of the present invention, the method according to the first aspect is a computer-implemented method.

According to one specific embodiment of the present invention, the method according to the first aspect is imple-mented or carried out with the aid of the device according to the second aspect.

Device features are derived analogously from correspond-ing method features and vice versa. Namely, this means that technical functions of the device according to the second aspect are derived analogously from corresponding techni-cal functionalities of the method according to the first aspect and vice versa.

The formulation "at least one" stands particularly for "one or more."

Exemplary embodiments of the present invention are explained in greater detail in the following description and represented in the figures.

DETAILED DESCRIPTION OF EXAMPLE EMBODIMENTS

Figure 1:
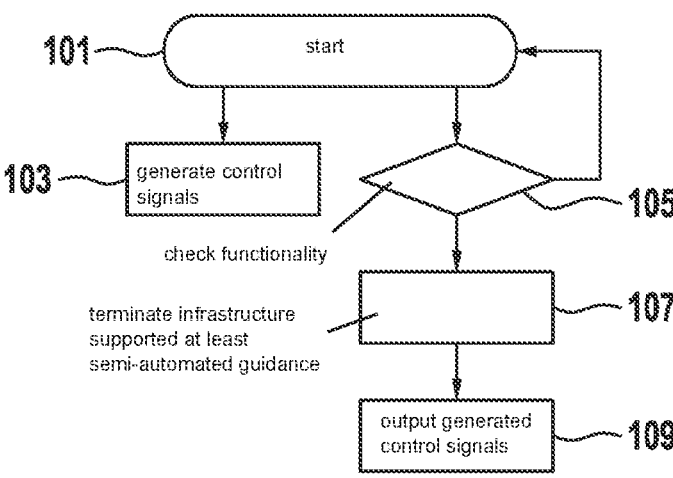
FIG. 1 shows a flowchart of a method for the safe, at least semi-automated guidance of a motor vehicle supported by an infrastructure, according to an example embodiment of the present invention.

FIG. 1 shows a flowchart of a method for the safe, at least semi-automated guidance of a motor vehicle supported by an infrastructure.

The method starts at block 101.

While the motor vehicle is being guided in at least semi-automated fashion with the support of an infrastructure, according to a step 103, control signals are generated for the at least semi-automated control of a lateral guidance and/or longitudinal guidance of the motor vehicle without infrastructure support. In addition, during the infrastructure-supported, at least semi-automated guidance of the motor vehicle, according to a step 105, a functionality of a support by the infrastructure for an at least semi-automated guidance of the motor vehicle is checked.

If check 105 has revealed that the functionality is not restricted, that is, is fully available, the method continues at block 101.

Otherwise, according to a step 107, the infrastructure-supported, at least semi-automated guidance of the motor vehicle is terminated.

Furthermore, according to a step 109, the generated control signals are then output in order to guide the motor vehicle in at least semi-automated fashion based on the output control signals, without support by the infrastructure.

In one specific embodiment, the method according to the first aspect includes a control of the lateral guidance and/or longitudinal guidance of the motor vehicle based on the output control signals.

In one specific embodiment, the method according to the first aspect includes the infrastructure-supported, at least semi-automated guidance of the motor vehicle.

Figure 2:
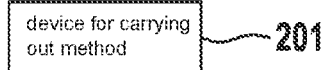
FIG. 2 shows a device according to an example embodi-ment of the present invention.

FIG. 2 shows a device 201.

Device 201 is equipped to carry out all steps of the method according to the first aspect.

Figure 3:
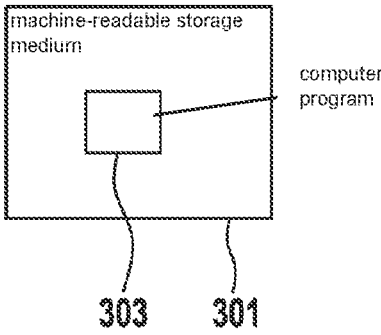
FIG. 3 shows a machine-readable storage medium, according to an example embodiment of the present inven-tion.

FIG. 3 shows a machine-readable storage medium 301.

A computer program 303 is stored on machine-readable storage medium 301. Computer program 303 includes commands which, upon execution of computer program 303 by a computer, prompt it to carry out a method according to the first aspect.

Figure 4:
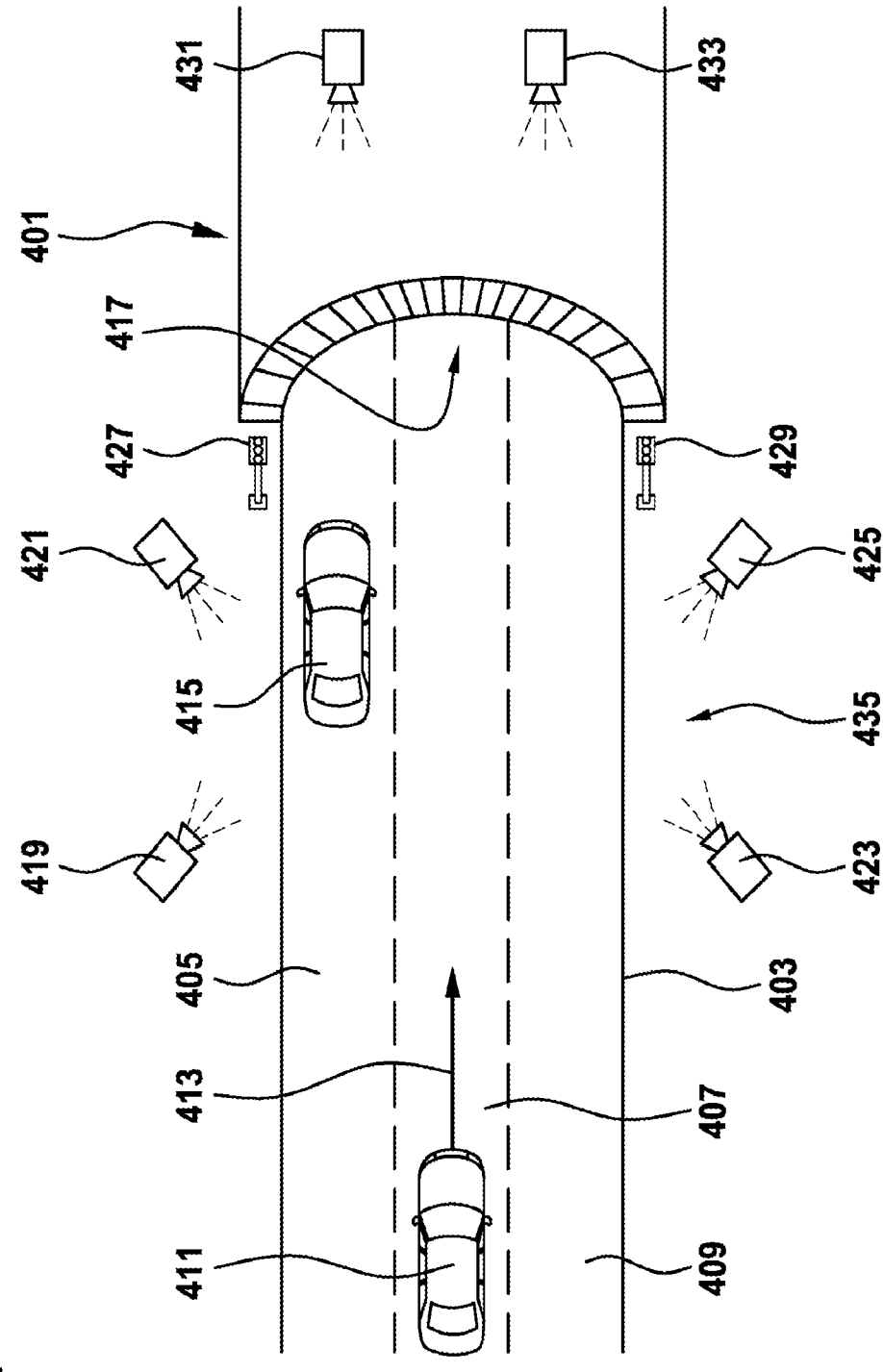
FIG. 4 shows a first tunnel.

FIG. 4 shows a first tunnel 401, through which a road 403 runs.

Road 403 has a first lane 405, a second lane 407 and a third lane 409.

A first motor vehicle 411 is traveling in center lane 407. A direction of travel of first motor vehicle 411 is identified by an arrow having reference numeral 413.

A second vehicle 415 is traveling ahead in lane 405 to the left of first motor vehicle 411.

A first video camera 419, a second video camera 421, a third video camera 423 and a fourth video camera 425 are distributed spatially in the surroundings, that is, in the vicinity of an entrance 417 to first tunnel 401.

First video camera 419 and third video camera 423 cover entrance 417 and, e.g., at least one area in first tunnel 401, which lies beyond entrance 417.

Second video camera 421 and fourth video camera 425 cover an area surrounding entrance 417, these two video cameras being directed away from entrance 417, whereas first video camera 419 and third video camera 423 are aligned in the direction of entrance 417.

In addition, located on the left side next to entrance 417 is a first traffic light 427, and a second traffic light 429 is on the right side next to entrance 417.

Located in first tunnel 401 itself are a fifth video camera 431 and a sixth video camera 433, which indeed are not visible from outside first tunnel 401, however these two video cameras 431, 433 are marked for better visualization.

These two video cameras 431, 433 are aligned in the direction of entrance 417 and cover a corresponding area within first tunnel 401.

The corresponding video signals or video images of these cameras may be transmitted, for example, to first motor vehicle 411 and/or to second motor vehicle 415 as an example for infrastructure data.

Moreover, according to one specific embodiment, the video images of these video cameras may be analyzed in order to detect potential problems, e.g., collision objects, such as a traffic jam within first tunnel 401.

According to one specific embodiment, a result of this analysis may be transmitted to first and/or second motor vehicle 411, 415 as an example for infrastructure data.

In addition, according to one specific embodiment, the two traffic lights 427, 429 may be operated based on an analysis of the video images.

Thus, for instance, the two traffic lights 427, 429 may be controlled in such a way that they emit a red signal image if a problem, e.g., a collision object such as a traffic jam was detected within first tunnel 401.

For instance, according to one specific embodiment, an instantaneous signal image of the two traffic lights 427, 429 may be transmitted as an example for infrastructure data to first motor vehicle 411 and/or to second motor vehicle 415.

As explained above, the two motor vehicles 411, 415 may be guided in at least semi-automated fashion, for example, based on the exemplary infrastructure data.

Thus, these two motor vehicles 411, 415 may be guided in at least semi-automated fashion with infrastructure support while driving through a tunnel.

Instead of a tunnel, for instance, the following infrastructure elements may be provided, through which a motor vehicle is to be guided in analogous manner in at least semi-automated fashion with infrastructure support: Construction site, bridge, turnpike intersection, turnpike entrance, turnpike exit, intersection, in general a road junction, especially a road junction in the urban area.

The six video cameras as well as traffic light 427 and traffic light 429 are thus part of an infrastructure 435, with whose aid a motor vehicle is able to be guided in at least semi-automated fashion through first tunnel 401.

In a specific embodiment not shown, instead of or in addition to the respective video cameras, one or more of the following driving-environment sensors may be used: Lidar sensor, radar sensor, ultrasonic sensor and/or motion sensor. In particular, various driving-environment sensors may be used. Notably, this has the technical advantage of redundancy and diversity.

Figure 5:
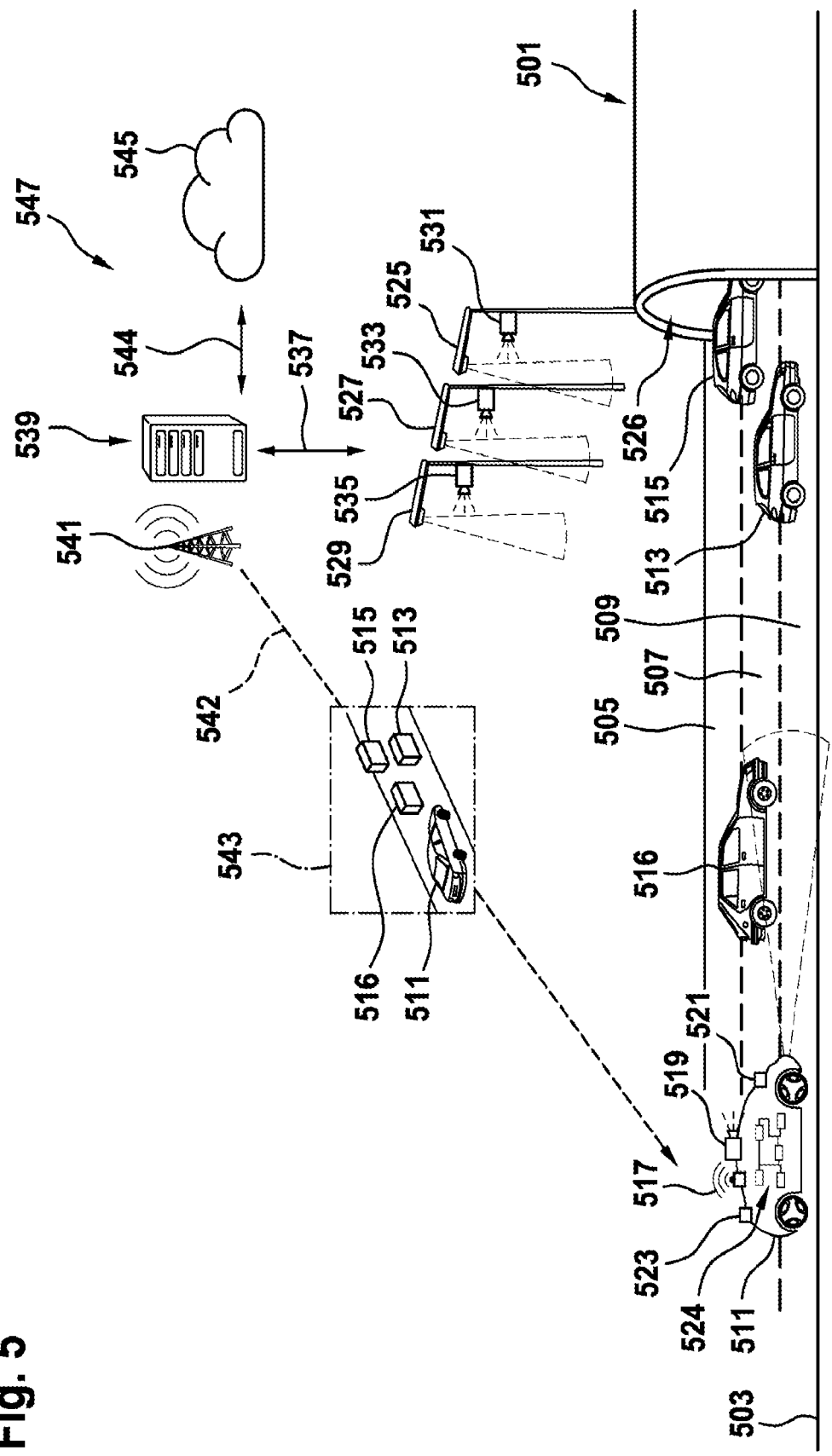
FIG. 5 shows a second tunnel.

FIG. 5 shows a second tunnel 501.

A road 503 runs through second tunnel 501.

Road 503 has a first lane 505, a second lane 507 and a third lane 509.

A direction of travel for motor vehicles which are traveling on road 503 through second tunnel 501 runs from left to right relative to the paper plane.

In relation to this direction of travel, first lane 505 is the left lane and second lane 507 is the center lane and third lane 509 is the right lane.

A first motor vehicle 511 and a second motor vehicle 513 are traveling in right lane 509.

A third motor vehicle 515 and a fourth motor vehicle 516 are traveling in center lane 507.

For example, first motor vehicle 511 has the following components or systems: Communication device 517, roof-side video camera 519, front-side radar sensor 521, rear-side radar sensor 523.

Reference numeral 524 points to several quadrangles which are included by first motor vehicle 511, these several quadrangles being intended to symbolize further components of motor vehicle 511, for example, actuators, sensors, control devices that are needed, for instance, to permit motor vehicle 511 to be guided in at least semi-automated fashion.

In addition, a first streetlight 525, a second streetlight 527 and a third streetlight 529 are disposed in the surroundings of an entrance or a mouth 526 of second tunnel 501.

A first video camera 531 is mounted on first streetlight 525. A second video camera 533 is mounted on second streetlight 527. A third video camera 535 is mounted on third streetlight 529.

In a specific embodiment not shown, the three video cameras are mounted on one particularly intended infrastructure element. By way of example, an infrastructure element is one of the following infrastructure elements: Streetlight, traffic sign, traffic-sign gantry.

In a specific embodiment not shown, instead of or in addition to the respective video cameras, one or more of the following driving-environment sensors may be used: Lidar sensor, radar sensor, ultrasonic sensor and/or motion sensor. In particular, various driving-environment sensors may be used. Notably, this has the technical advantage of redundancy and diversity.

These three video cameras record video images of entrance 526 or of an area surrounding entrance 526 outside of second tunnel 501.

The corresponding video images are transmitted via a first encrypted communication link 537 to a data-processing device 539. Data-processing device 539 analyzes these video images or video signals and, for example, transmits a result of this analysis with the aid of a second communication device 541 via an encrypted link 542 to first motor vehicle 511.

The result of the analysis is marked symbolically by reference numeral 543.

For instance, it includes a list of objects which were recognized utilizing the three video cameras.

The recognized or detected objects are represented in a digital surroundings model of the area surrounding entrance 526, for example.

The result of this analysis is thus an example for infrastructure data which is transmitted to first motor vehicle 511, so that first motor vehicle 511 is able to travel through second tunnel 501, guided in at least semi-automated fashion based on this data.

For example, data-processing device 539 communicates with a cloud infrastructure 545 via a third communication link 544.

Third communication link 544 may likewise be an encrypted communication link.

For example, analysis steps of an analysis of the video images may be carried out in cloud infrastructure 545.

Cloud infrastructure 545 may provide memory for storing video images, for instance.

Thus, the three video cameras 531, 533, 535, data-processing device 539 and second communication device 541 are part of an infrastructure 547, which is able to assist or support first motor vehicle 511 during an at least semi-automated guidance.

In particular, a basic idea of the present invention disclosed herein includes a method, with which the safety of a motor vehicle guided in at least semi-automated fashion is increased, that accomplishes the at least semi-automated driving task (with safety-critical actions such as steering, braking, swerving) on the basis of an infrastructure, in the case where the infrastructure, unplanned, is no longer (especially correctly/completely) available.

In particular, the present invention is based on the fact that, e.g., besides and in parallel to the use of the infrastructure (data or control), the driving task is carried out without the infrastructure (data or control) in the motor vehicle.

In one specific embodiment, the driving task is carried out in the motor vehicle in full operating mode (all functionalities), and in one specific embodiment is carried out in a restricted operating mode, e.g., without comfort aspects.

In addition, according to one specific embodiment, it is checked simultaneously whether the infrastructure, that is, the infrastructure data, is available and preferably is correct/possible/reasonable (e.g., by crosschecks with the parallel method, which means, for example, that the control signals generated without support of the infrastructure are used to check the infrastructure data for plausibility and/or correctness).

In the event it is determined that the infrastructure is not available and/or the infrastructure data is not correct/possible/reasonable, a change is made by the motor vehicle to a vehicle-centered operating mode in which the motor vehicle is guided in at least semi-automated fashion based on the data generated in the motor vehicle, without infrastructure support.

In one specific embodiment, preferably the check is carried out repeatedly prior to the change, in order to possibly detect a temporary loss.

Should the loss have no effect, according to one specific embodiment, the infrastructure may continue to be used, for instance, with an additional check and/or with a restricted functionality.

If a change-over is made to the vehicle-centered operating mode, in such a case, preferably the functionality (the driving task) is reduced.

The background is that the addition of the infrastructure was necessary, for example, and/or was intended to contribute to better performance.

According to one specific embodiment, one possibility, for example, is to reduce the speed.

According to one specific embodiment, a further possibility is to initiate the motor vehicle's own fallback mechanism, thus backup mechanism (e.g., initiate, especially continue, the safe state).

According to one specific embodiment, a further possibility, for example, is the addition of the driver (if possible).

Furthermore, in such a case, according to one specific embodiment, the motor vehicle informs the infrastructure and/or other motor vehicles (especially via V2X, and so forth) that because of errors/problems, the motor vehicle is no longer carrying out the driving task on the basis of the infrastructure, that is, that potentially a danger exists and the information preferably includes an indication of the problems.

In a further specific embodiment, the procedures are documented in a manner impossible to counterfeit, e.g., with the aid of blockchains.

What is claimed is:

1. A method for safe, at least semi-automated guidance of a motor vehicle, supported by an infrastructure, the method comprising the following steps:

during the infrastructure-supported, at least semi-automated guidance of the motor vehicle:

generating control signals for at least semi-automated control of a lateral guidance and/or longitudinal guidance of the motor vehicle without infrastructure support, checking a functionality of a support by the infrastructure for an at least semi-automated guidance of the motor vehicle, wherein the checking the functionality includes using the generated control signals without infrastructure support to check infrastructure data, which is provided by the infrastructure, for plausibility and/or correctness, terminating the infrastructure-supported, at least semi-automated guidance of the motor vehicle depending on a result of the checking, wherein when a temporary limitation is detected, the infrastructure-supported, at least semi-automated guidance of the motor vehicle is not terminated; and outputting control signals to guide the motor vehicle in at least semi-automated fashion based on the generated control signals, without the support by the infrastructure, wherein the control signals are generated in such a way that based on the output control signals, the motor vehicle: (i) is guided in at least semi-automated fashion in a restricted driving mode in which only a limited range of functions in terms of the at least semi-automated guidance is made available, or (ii) is guided in at least semi-automated fashion in a non-restricted driving mode in which a full range of functions in terms of the at least semi-automated guidance is made available, wherein a distance to an object located in front of the motor vehicle in the direction of travel of the motor vehicle is greater in the restricted driving mode than in the non-restricted driving mode.

2. The method as recited in claim 1, wherein the checking of the functionality of the support by the infrastructure includes checking correctness and/or plausibility of infrastructure data determined for the at least semi-automated guidance of the motor vehicle, so that the result indicates whether the infrastructure data is correct and/or plausible.

3. The method as recited in claim 1, wherein a maximum permissible motor-vehicle speed is less in the restricted driving mode than in the non-restricted driving mode.

4. The method as recited in claim 1, wherein prior to the termination of the infrastructure-supported, at least semi-automated guidance of the motor vehicle and the output of the generated control signals, the step of checking the functionality of the support by the infrastructure is carried out multiple times, and depending on one or more pertinent results of the repeated check of the functionality of the support by the infrastructure, it is decided whether the infrastructure-supported, at least semi-automated guidance of the motor vehicle will be terminated and the generated control signals output.

5. The method as recited in claim 1, wherein when the result of the checking of the functionality of the support by the infrastructure indicates a loss of the functionality or a limitation of the functionality, it is checked whether the loss or the limitation has an effect on the at least semi-automated guidance of the motor vehicle, the infrastructure-supported, at least semi-automated guidance of the motor vehicle being terminated and the control signals being output depending on the result of the checking as to whether the loss or the limitation has the effect on the at least semi-automated guidance of the motor vehicle.

6. The method as recited in claim 1, wherein one or more method steps are documented in a blockchain.

7. A device configured for safe, at least semi-automated guidance of a motor vehicle, supported by an infrastructure, the device configured to:

during the infrastructure-supported, at least semi-automated guidance of the motor vehicle:

generate control signals for at least semi-automated control of a lateral guidance and/or longitudinal guidance of the motor vehicle without infrastructure support, check a functionality of a support by the infrastructure for an at least semi-automated guidance of the motor vehicle, wherein the check of the functionality includes using the generated control signals without infrastructure support to check infrastructure data, which is provided by the infrastructure, for plausibility and/or correctness, terminate the infrastructure-supported, at least semi-automated guidance of the motor vehicle depending on a result of the checking, wherein when a temporary limitation is detected, the infrastructure-supported, at least semi-automated guidance of the motor vehicle is not terminated; and output control signals to guide the motor vehicle in at least semi-automated fashion based on the generated control signals, without the support by the infrastructure, wherein the control signals are generated in such a way that based on the output control signals, the motor vehicle: (i) is guided in at least semi-automated fashion in a restricted driving mode in which only a limited range of functions in terms of the at least semi-automated guidance is made available, or (ii) is guided in at least semi-automated fashion in a non-restricted driving mode in which a full range of functions in terms of the at least semi-automated guidance is made available, wherein a distance to an object located in front of the motor vehicle in the direction of travel of the motor vehicle is greater in the restricted driving mode than in the non-restricted driving mode.

8. A non-transitory machine-readable storage medium on which is stored a computer program for safe, at least semi-automated guidance of a motor vehicle, supported by an infrastructure, the computer program, when executed by a computer, causing the computer to perform the following steps:

during the infrastructure-supported, at least semi-automated guidance of the motor vehicle:

generating control signals for at least semi-automated control of a lateral guidance and/or longitudinal guidance of the motor vehicle without infrastructure support, checking a functionality of a support by the infrastructure for an at least semi-automated guidance of the motor vehicle, wherein the checking the functionality includes using the generated control signals without infrastructure support to check infrastructure data, which is provided by the infrastructure, for plausibility and/or correctness, terminating the infrastructure-supported, at least semi-automated guidance of the motor vehicle depending on a result of the checking, wherein when a temporary limitation is detected, the infrastructure-supported, at least semi-automated guidance of the motor vehicle is not terminated; and outputting control signals to guide the motor vehicle in at least semi-automated fashion based on the generated control signals, without the support by the infrastructure, wherein the control signals are generated in such a way that based on the output control signals, the motor vehicle: (i) is guided in at least semi-automated fashion in a restricted driving mode in which only a limited range of functions in terms of the at least semi-automated guidance is made available, or (ii) is guided in at least semi-automated fashion in a non-restricted driving mode in which a full range of functions in terms of the at least semi-automated guidance is made available, wherein a distance to an object located in front of the motor vehicle in the direction of travel of the motor vehicle is greater in the restricted driving mode than in the non-restricted driving mode.

* * * * *